July 4, 1961   G. E. BLOOM ET AL   2,990,642
FISHING ACCESSORIES
Filed March 26, 1958
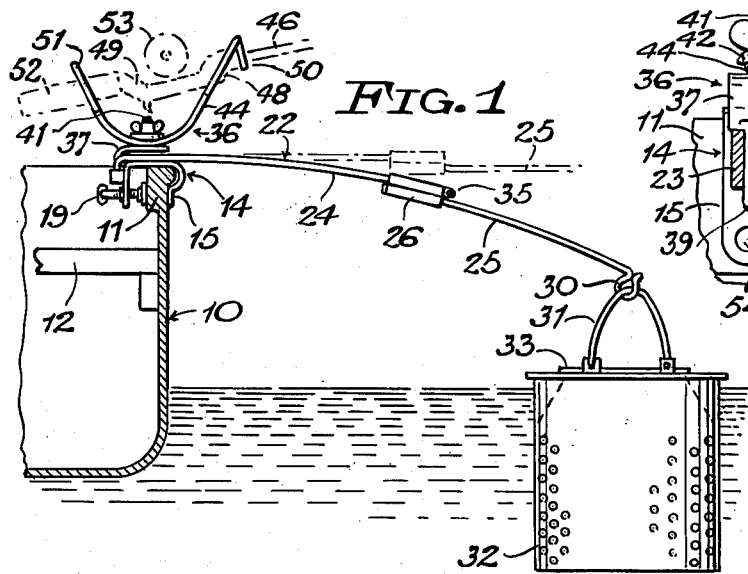
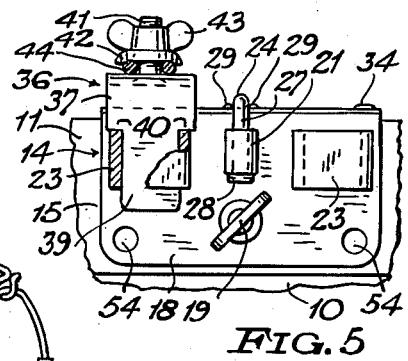
INVENTORS
GEORGE E. BLOOM
STEVE KEARNS
AND GEORGE BLOOM
BY Christopher L. Waal
ATTORNEY United States Patent Office 2,990,642
Patented July 4, 1961

2,990,642
FISHING ACCESSORIES
George E. Bloom, 1323 W. Becher St.; Steve Kearns, 1026-A S. 11th St.; and George Bloom, 1500 E. Oklahoma Ave., all of Milwaukee, Wis.
Filed Mar. 26, 1958, Ser. No. 724,143
3 Claims. (Cl. 43—55)

The present invention relates to fishing accessories adapted for use on boats.

An object of the invention is to provide a fishing accessory for holding an immersible minnow receptacle outboard of a boat in such manner as to prevent contact of the receptacle with the side of the boat, thus obviating scratching or striking of the boat and avoiding unnecessary noise, the receptacle being nevertheless readily shiftable at will to a position near the side of the boat for convenient access by fishermen in the boat.

Another object is to provide a fishing accessory of this character including a swingable arm to the outer end of which the minnow receptacle is attached, the swingable arm being normally retained in laterally projecting position with respect to the boat but being swingable forwardly and rearwardly to selective positions near the side of the boat so that the receptacle will be easily accessible to fishermen occupying forward and rearward seats in the boat.

Still another object is to provide a fishing accessory in which the receptacle-holding arm is resilient and can yield during wave action and rocking movement of the boat, and in which the receptacle is locked against loss in rough water, the yielding of the arm reducing stresses on the device and minimizing lifting of the receptacle from the water.

A further object is to provide a minnow receptacle holder which also includes means for mounting other fishing equipment, such as rod holders and fish stringers, without interfering with the swinging displacement of the receptacle-holding arm.

A still further object is to provide a fishing accessory which is of simple and inexpensive construction, and which is capable of forming a compact unit adapted to fit in a tackle box.

The invention further consists in the several features hereinafter described and claimed.

In the accompanying drawing,

FIG. 1 is an elevational view of a fishing accessory of the invention mounted on a boat, a resilient swingable arm of the device being attached to an immersed minnow receptacle, and the boat being shown in transverse section;

FIG. 2 is a fragmentary top view of the boat with the fishing accessory mounted thereon, shifted positions of the arm-attached receptacle being shown in broken lines;

FIG. 3 is an enlarged elevational view of the accessory mounted on the boat gunwale, parts being shown in section, and the receptacle being omitted;

FIG. 4 is a top view of the mounted accessory, shifted positions of the swingable arm thereof being shown in broken lines;

FIG. 5 is an inboard elevational view of the mounted accessory, parts being shown in section, and FIG. 6 is a perspective view of a fishing rod holder element.

In the drawing, 10 designates a boat having the usual gunwale 11 at the side thereof and provided with the usual transverse seats 12 and 13 spaced longitudinally of the boat.

The fishing accessory of the invention is designated generally by the numeral 14 and includes a bracket or mounting member 15 of inverted U-shape adapted to be saddled over and detachably secured to the boat gunwale, such as at a region about midway the boat seats 12 and 13. The bracket, which is of sheet metal or cast metal construction, comprises a flat top wall 16 and generally vertical outer and inner leg portions 17 and 18, the outer leg portion 17 being bulged at its upper part to clear gunwale beading. A horizontally extending wing screw 19 is threaded transversely through the inner leg portion 18 of the bracket and has a swiveled clamping pad 20 engageable with the inner wall of the boat side or gunwale. The bracket can thus be firmly clamped to the boat.

Secured medially to the inner leg portion 18 of the gunwale bracket 15 above the clamping screw and near the top wall of the bracket is a vertical tubular bearing socket 21 for mounting a swingable receptacle-holding arm 22 hereinafter more fully described. At opposite sides of the socket 21 the bracket leg portion 18 is further provided with a pair of vertically extending sockets 23 for detachably receiving other holding elements, as hereinafter described. The several sockets may be welded or cast in place, or they may be formed by striking up the metal of the bracket.

The swingable arm 22 is formed by a pair of resilient metal rod sections 24 and 25 the adjacent ends of which are connected by a double sleeve connector 26, one or both of the rod sections being rotatable in the connector. The inner rod section 24 of the arm has a downturned vertical end portion 27 which is rotatably mounted in the bracket socket 21 and is provided with an end flange or projection 28 to hold the rod end portion in the socket. The rod section 24 slidably rests on the flat top wall of the gunwale bracket and normally extends outwardly at about right-angles to the gunwale, being releasably retained in such position by a pair of spaced detent projections or ridges 29 formed on the bracket top wall. At its outer end the outer rod section 25 is bent to form a hook or loop 30 in the vertical plane of this rod section for receiving the handle or bail 31 of a live bait or minnow receptacle 32 which is preferably of a buoyant or floating type. This receptacle is usually the inner perforated cage or screen member of a conventional minnow bucket and is here shown to have the usual hinged cover 33. The hook or loop 30 on the resilient rod section 25 is preferably closed to prevent loss of the receptacle, but can be sprung apart to admit and detach the bail 31. The arm 22 can be swung forwardly and rearwardly, as indicated in FIG. 2, and may be retained in its displaced position either frictionally or by detent projections 34, FIG. 4. In some instances, the swingable arm may be provided with an eye 35 for attaching actuating cords, not shown.

In the use of the device thus far described, the minnow screen member or receptacle 32 is swingably suspended from the hooked outer end 30 of the resilient swingable arm 22, as seen in FIG. 1, and is at least partially immersed to keep alive the minnows or live bait in the receptacle. The receptacle is spaced outwardly of the boat a sufficient distance to prevent scraping or striking of the receptacle against the boat and to avoid unnecessary noise. The resilient arm 22 is flexed downwardly from a substantially straight free condition under the weight of the receptacle and will yield under wave action and rocking of the boat to minimize stresses on the device and to avoid excessive lifting of the immersed receptacle. The slip sleeve connector 26 is also capable of rocking on one or both of the rod sections. When one of the fishermen desires to remove bait from the receptacle, the swingable arm 22 is swung forwardly or rearwardly, as the case may be, to place the receptacle 32 near the side of the boat and reasonably close to the fisherman, thus permitting convenient access to the receptacle and avoiding unnecessary movement or shifting of the occupants of the boat. After the bait is removed from the receptacle the swingable receptacle-holding arm is restored to its outboard position.

One of the lateral sockets 23 of the gunwale bracket 15 is here shown to detachably mount a fishing rod holder 36. This holder comprises an angle-shaped bracket member 37, such as of pressed sheet metal, having a horizontal platform 38 and a downwardly projecting vertical tongue 39, the latter being inserted in the socket 23 against rotation and frictionally retained therein, and being reduced in width to form downwardly facing stop shoulders 40 engageable with the upper end of the socket. The horizontal bracket platform 38 extends outwardly over the flat top wall 16 of the gunwale bracket and is spaced above this top wall so as to permit the receptacle-holding arm 22 to pass under the bracket platform when the arm is swung inwardly, thus avoiding interference with the swinging travel of the arm. The horizontal bracket platform 38 carries an upwardly projecting bolt 41 provided with a clamping washer 42 and wing nut 43. A U-shaped rod-holding body 44, here shown to be formed from a length of wire, has laterally spaced slot-forming wire portions 45 clamped between the bracket platform 38 and washer 42. After loosening the wing nut 43, the rod-holding body can be swiveled and tilted to various positions. The spaced upper ends of the U-shaped body are adapted to detachably support a fishing rod 46, as seen in FIG. 1. Near the upper outer end of the U-shaped body the wire portions are offset outwardly to form a space 47, FIG. 2, for receiving an enlarged part 48 of the rod handle 49, and the wire portions are reversely bent and joined to form a concave seat 50 for the rod. At the other upper end of the U-shaped body the wire portions are joined to form an enlarged circular loop 51 for receiving the hand-grip 52 of the fishing rod handle. The reel 53 on the rod is placed between the ends of the U-shaped body. The fishing rod is thus detachably supported on the holder against lateral tipping.

The other lateral socket 23 of the gunwale bracket may detachably receive a second similar rod holder, not shown, or it may detachably receive a fish stringer, not shown, or other fishing device. The rod holder bracket element 37 is here shown to overlie the gunwale bracket, but in some instances it may be reversed to occupy an inboard position. If desired, the inner gunwale bracket leg 18 may have openings 54, FIG. 5, for attaching fish stringers or other members.

When the device is not in use, the rod holder may be removed from the gunwale bracket, and the sectional swingable rod 22 may be shortened by sliding the outer rod section 25 inwardly, thus forming compact units which can be placed in a tackle box.

We claim:

1. A fishing accessory assembly comprising a resilient arm adapted to project outwardly from a side portion of a boat, and means for swingably mounting said arm on said boat to turn about a generally vertical axis, an immersible live bait receptacle detachably connected to the outer end of said resilient arm to hold said receptacle spaced from the boat, said receptacle when immersed normally bending said resilient arm downwardly, said arm being swingable about its axis to bring the receptacle to a position adjacent to the boat for access thereto by a fisherman in the boat, the outer end of said arm having a normally closed resilient hook for attachment of the receptacle.

2. A fishing accessory assembly comprising a mounting member adapted to be secured to a side portion of a boat, and a resilient arm pivotally carried by said mounting member to turn about a generally vertical axis and normally projecting laterally outwardly from said member, an immersible live bait receptacle detachably connected to the outer end of said resilient arm to hold said receptacle spaced from the boat, said receptacle when immersed normally bending said resilient arm downwardly, the flexing of said resilient arm permitting said attached receptacle to remain in immersed position regardless of wave motion and rocking of the boat said arm being swingable from its laterally projecting position to place the receptacle in a position adjacent to the boat for access thereto by a fisherman in the boat.

3. In a fishing accessory assembly, a mounting member adapted to be secured to a side portion of a boat and having a top wall and an inner portion extending downwardly from the top wall, and a resilient arm pivotally mounted on said inner mounting member portion to turn about a generally vertical axis, said arm slidably resting on said top wall and normally projecting outwardly of said mounting member, said top wall having detent projections releasably retaining said arm in its outwardly projecting position, an immersible live bait receptacle detachably connected to the outer end of said resilient arm to hold said receptacle spaced from the boat, said receptacle when immersed normally bending said resilient arm downwardly, the flexing of said resilient arm permitting said attached receptacle to remain in immersed position regardless of wave motion and rocking of the boat, and said arm being swingable to bring the receptacle to a position adjacent to the boat for access thereto by a fisherman in the boat.

References Cited in the file of this patent

UNITED STATES PATENTS

| | | |
|---|---|---|
| 377,456 | Haitz | Feb. 7, 1888 |
| 417,959 | Welton | Dec. 24, 1889 |
| 817,969 | Galbraith | Apr. 17, 1906 |
| 821,364 | Jessel | May 22, 1906 |
| 833,027 | Crotchett | Oct. 9, 1906 |
| 1,788,536 | Merckel | Jan. 13, 1931 |
| 1,992,165 | Bardon | Feb. 26, 1935 |
| 2,367,588 | Kruse | Jan. 16, 1945 |
| 2,416,828 | Hambre | Mar. 4, 1947 |
| 2,430,112 | Hambre | Nov. 4, 1947 |
| 2,734,555 | Kroner | Feb. 14, 1956 |
| 2,834,138 | Pedersen | May 13, 1958 |
| 2,835,066 | Spilker | May 20, 1958 |

FOREIGN PATENTS

| | | |
|---|---|---|
| 401,275 | Great Britain | Nov. 6, 1933 |
| 596,336 | France | Aug. 8, 1925 |
| 633,720 | Great Britain | Dec. 19, 1949 |